Figure 1:
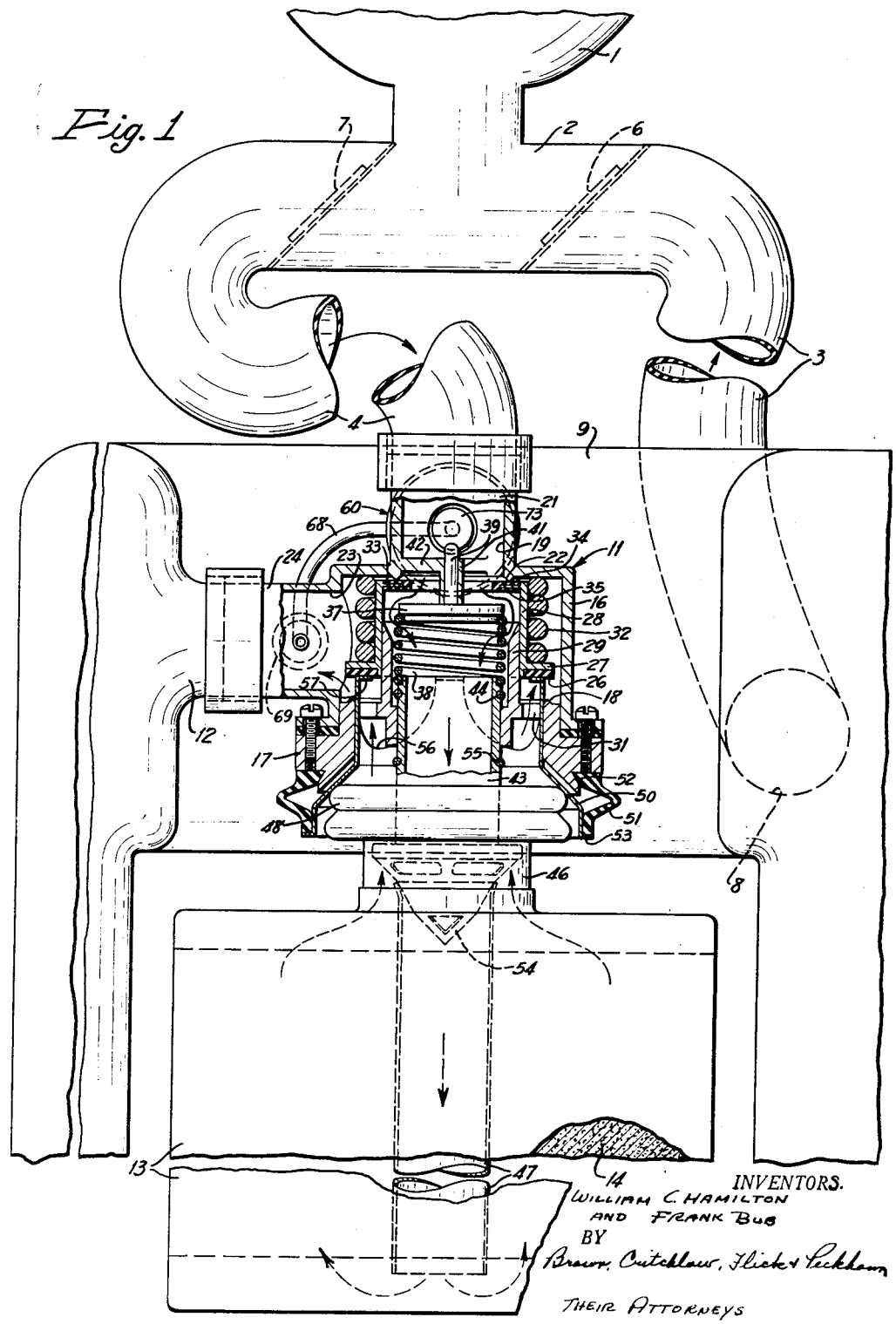

INVENTORS
WILLIAM C HAMILTON AND
BY      FRANK BUB

Brown, Critchlow, Flick & Pecham
Their Attorneys

Patented June 1, 1954

2,679,844

UNITED STATES PATENT OFFICE 2,679,844

BREATHING APPARATUS SLIDE VALVE

William C. Hamilton and Frank Bub, Pittsburgh, Pa., assignors to Mine Safety Appliances Company, Pittsburgh, Pa., a corporation of Pennsylvania Application March 19, 1952, Serial No. 277,408

8 Claims. (Cl. 128—191)

This invention relates to valves, and more particularly to slide valves in self-contained breathing apparatus provided with removable air-purifying canisters of the type that not only remove carbon dioxide from the exhaled breath, but also generate oxygen and introduce it into the breathing cycle.

The slide valve disclosed herein is for use in the general type of breathing apparatus shown in Jackson et al. Patent No. 2,403,981, where exhaled air flows through a slide valve and then through a removable air-purifying canister and then back through the valve to a breathing bag that is connected with the inlet of a face-piece.

It is an object of this invention to provide a valve which will connect both an exhalation tube and a breathing bag inlet with a removable air-purifying canister, but which will connect the exhalation tube directly with the bag inlet when the canister is removed. Another object is to provide such a valve which will prevent the entrance of any outside atmosphere while a canister is being removed or replaced. A further object is to provide a valve that controls the breathing bag pressure without wasting pure oxygen, and that controls the rate of oxygen generation in the canister.

In accordance with this invention, a valve casing is provided with an inlet port adapted to be connected to the exhalation tube of a face-piece, and with an outlet port adapted to be connected to a breathing bag inlet. One of these valve ports is at the side of the casing and the other is at one end of it. The opposite end of the casing is provided with an opening in which a tubular coupling is slidably mounted. The outer end of the coupling is formed for sealing engagement with an air-purifying canister around a port in the canister. The canister has a second part concentric with the one just mentioned, one of them being an inlet and the other an outlet. The inside of the valve casing has an annular valve seat around its end port, and an intermediate annular valve seat between its side port and the canister and facing the end seat. The inside of the casing also is provided, at a point spaced radially inward from the intermediate seat, with tubular means, the outer end of which extends through the coupling and is adapted to be sealingly engaged by the wall of the inner port of the canister when the canister pushes the coupling farther into the casing. A sleeve valve is slidably mounted on the inner end of the tubular means and normally is spaced from the casing end seat. The sleeve valve is formed to seat against the two seats alternately, so that when it engages the end seat the side port of the casing is in direct communication with the inside of the coupling, and when the sleeve valve engages the intermediate seat the side port is in direct communication with the casing end port. A spring normally holds the sleeve valve against the intermediate seat, but the coupling is formed at its inner end for pushing the sleeve valve away from that seat and against the end seat when the coupling is pushed inward by the canister. The inner end of the coupling wall is provided with openings to permit air to flow across the intermediate seat. The sleeve valve is provided with an inner annular valve seat, and a valve member is disposed inside the sleeve valve between its seat and the canister. The valve member engages the sleeve seat while the sleeve valve is seated on the intermediate seat in the casing, thereby shutting off communication between the casing end port and the tubular means. The valve preferably is provided with a dump valve communicating with the casing inlet port. The dump valve includes a housing provided with a normally closed passage from the inlet end of the casing to the atmosphere. There are gas pressure operated means in the housing for opening the passage, and a conduit connects the outlet end of the casing with the housing in order to subject the gas pressure operated means to the air pressure at the outlet of the casing. When that pressure exceeds a predetermined value, the gas pressure operated means are operated to open the passage from the casing inlet to the atmosphere.

Figures 2, 3, 4:
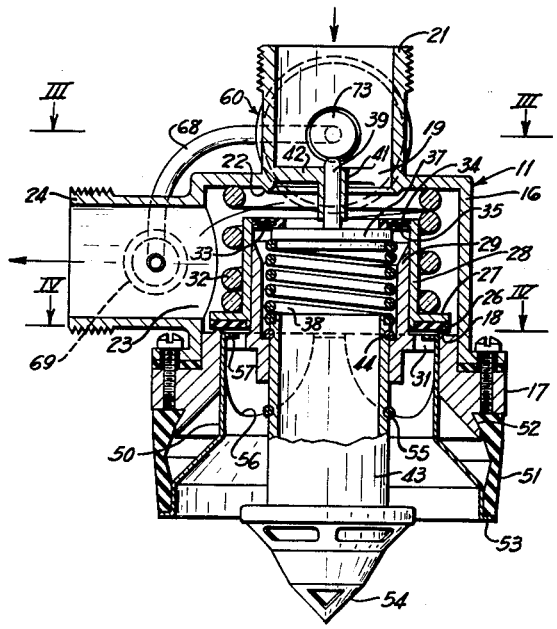

The preferred embodiment of the invention is illustrated in the accompanying drawings, in which Fig. 1 is a fragmentary front view of self-contained breathing apparatus showing our slide valve in vertical section; Fig. 2 is a similar view of the valve alone, but with the parts in the positions they occupy when the canister is removed; Fig. 3 is a horizontal section through the valve taken on the line III—III of Fig. 2; and Fig. 4 is a horizontal section taken on the line IV—IV of Fig. 2.

There is shown in Fig. 1 of the drawings the lower portion of a face-piece 1 which fits over at least the mouth and nose of the wearer. The center of the lower part of the face-piece is provided with a breathing opening, to which is connected a rigid horizontal breathing tube 2 that terminates in two downwardly extending flexible tubes 3 and 4. Exhalation takes place through only tube 4 because a check valve 6 mounted in the opposite end of rigid tube 2 prevents air from passing out through the inhalation tube 3. A check valve 7 at the other end of the rigid tube prevents inhalation through the exhalation tube. The inhalation tube is connected to an outlet 8 in the back of one side of a flexible breathing bag 9 of well known bifurcated design. The lower end of the exhalation tube is connected to the inlet of a slide valve 11 that has an outlet connected to the inlet 12 of the breathing bag at the side of the apparatus opposite to breathing bag outlet 8. The lower part of the slide valve communicates with the top of a removable air-purifying canister 13 in which carbon dioxide is absorbed and oxygen is liberated by a chemical 14 in a well known manner. Exhaled air entering the slide valve from the exhalation tube passes through the canister where it is purified and receives oxygen and then enters the breathing bag through inlet 12. The purified air and oxygen in the bag are drawn through inhalation tube 3 to the face-piece. A closed breathing cycle thus is formed. When the canister is removed, exhaled air flows through the slide valve directly from exhalation tube 4 to bag inlet 12, as will now be explained.

Before a canister is applied to the apparatus, either initially or after a used canister has been removed, the movable parts of the slide valve 11 appear in the positions shown in Fig. 2. The casing of the valve is formed in two parts, an upper inverted cup-like member 16 and a lower ring 17 bolted to the lower flange of the upper member and projecting a short distance up into it to form a lower annular valve seat 18 between the ends of the casing. The top of the casing is provided with a central inlet port 19, from which an integral neck 21 extends upward. The upper end of this neck is threaded for connection to the lower end of exhalation tube 4. Encircling the lower end of the inlet port is a valve seat 22 facing lower seat 18. The side of the casing is provided between the two seats with an outlet port 23, from which a screw threaded integral neck 24 extends laterally for connection to inlet 12 of the breathing bag.

The lower valve seat 18 normally is engaged by a closure member formed from a sealing gasket 26 fastened to the bottom of a flange 27 projecting radially from the lower end of a sleeve 28. This sleeve is slidably mounted on the upper part of a hollow cylinder 29 spaced radially inward from the lower valve seat and extending above and below it. The cylinder is supported by a few spokes 31 from the encircling ring 17, with which it preferably is integral and concentric. Gasket 26 is pressed down against seat 18 by a heavy coil spring 32 encircling the sleeve and compressed between the top of flange 27 and the top of the casing. The upper end of the sleeve projects above cylinder 29 and is provided inside with a radial flange 33, on the upper and lower surfaces of which there are sealing gaskets 34 and 35, respectively. The upper end of the sleeve normally is spaced a short distance from the top of the casing so that air can flow across the upper valve seat, as shown in Fig. 2. If the sleeve is moved upward on the cylinder, the lower seat will first be uncovered and then the upper gasket 34 will engage the upper seat, as shown in Fig. 1.

To close the passage through sleeve 28 and cylinder 29 when the sleeve is in its lower position (Fig. 2) a valve disc 37 inside the sleeve is pressed against the inner gasket 35 by means of a coil spring 38 that is weaker than the other spring. The center of this disc is provided with a stem 39 that is slidably mounted in a boss 41 projecting down into the casing from integral spokes 42 connecting it with the wall of inlet port 19. The lower end of spring 38 presses against the upper end of a rigid coupling tube 43 slidably mounted in the reduced lower part of cylinder 29. Downward movement of the tube in the cylinder is limited by a snap ring 44 clamped on the upper part of the tube.

This valve is designed for use with an air-purifying canister 13 of the type which has concentric inlet and outlet ports at its upper end. The outlet port is formed between a neck 46 on the canister and a metal tube 47 in the center of the neck extending down to a point near the bottom of the canister and below the surrounding carbon dioxide-removing and oxygen-generating chemical 14 therein. The flared upper end of the tube forms the canister inlet port. Exhaled air entering the upper end of the tube flows down through it and leaves its lower end from which the air spreads out in the lower part of the canister and then passes up through the chemical and out through the space between the upper end of the tube and the encircling neck. Mounted on the upper end of the neck is a sealing gasket 48, and before the canister is put into use, the top of the neck is sealed by the usual thin metal sealing disc (not shown).

In order to provide air tight communication between the slide valve and the canister, the upper part of a tubular coupling 50 is slidably mounted in valve casing ring 17. This coupling preferably is flared out some distance below the ring to form a skirt adapted to receive and engage the sealing gasket 48 on the neck of the canister. The coupling or skirt normally is held in its lower position by an encircling rubber-like ring 51, which has its upper end mounted in a groove 52 around casing ring 17 and its lower end secured to a flange 53 around the bottom of the skirt. The resilient ring also prevents air from entering the valve casing between the coupling and ring 17. When the sealing gasket on a canister is inserted in the skirt and the canister is raised, the coupling is pushed upward in the valve casing. This causes a perforated point 54 on the coupling tube to pierce the thin sealing disc on the neck of the canister so that the point can project into the upper end of canister tube 47 in sealing engagement with it. Spring 38 allows the coupling tube to be pushed upward in cylinder 29 by canister tube 47 until valve sleeve 28 reaches its upper limit of movement. The canister is locked in its upper position by any suitable means, as is well known in this art. To prevent coupling tube 43 from being pushed upward too far in case the sealing disc on the canister is not readily pierced, a snap ring 55 is mounted on the tube below cylinder 29. This ring will limit the distance that the coupling tube can be moved upward, when necessary.

The upper or inner end of skirt coupling 50 is provided with openings, preferably formed by cutting circumferentially spaced recesses 56 in the upper end. The upper ends of the portions of the coupling between these recesses are turned inward at 57 and normally are spaced a short distance below lower gasket 26 of the sleeve valve, as shown in Fig. 2. This spacing assures the canister neck gasket firmly engaging the skirt before the upper end of coupling 50 engages the gasket and starts to push it away from lower seat 18. Therefore, no outside air can leak past the lower seat before the skirt and canister gasket are in sealing engagement with each other. Continued upward movement of the canister causes the coupling to move the upper sleeve gasket 34 into engagement with valve seat 22 at the top of the casing, as shown in Fig. 1. This shuts off direct communication between inlet port 19 and outlet port 23 of the valve casing. At the same time it connects the inlet port with coupling tube 43, because the valve disc 37 inside of sleeve 28 can only rise with it a short distance before being stopped by the lower end of boss 41. Further upward movement of the sleeve therefore opens the passage downward through the sleeve and cylinder 29.

Another feature of this invention is that slide valve 11 is provided with means for relieving gas pressure in the breathing circuit when that becomes necessary, and for controlling the volume of oxygen generated in the canister. This is accomplished by a dump valve 60 that is located on the inlet side of the slide valve, but is controlled by air pressure at the outlet side of the slide valve. As shown in Fig. 3, the dump valve includes a cup-like housing 61 provided with a neck 62 that is screwed into a tubular boss 63 integral with the top of casing 16 and its inlet neck 21. The passage through this boss opens into the side of neck 21. The dump valve housing 61 has its outer end closed by a flanged cap 64 that is clamped in place by a ring 66 screwed on the housing. The cap clamps a flexible diaphragm 67 against a shoulder in the housing, and has a central opening connected by a small metal tube 68 with a boss 69 on the side of outlet neck 24 of the slide valve, so that the diaphragm is subject to the air pressure at the outlet side of the slide valve. Diaphragm 67 engages a head 70 on the outer end of a horizontal valve stem 71 that is slidably mounted in a spider 72 in the passage through housing neck 62. The inner end of this neck serves as a valve seat, and a valve disc 73 mounted on the inner end of stem 71 is held against this seat by a coil spring 74 compressed between the spider and the head of the stem. Whenever the air pressure in outlet neck 24 increases sufficiently to overcome the resistance of dump valve spring 74, diaphragm 67 will be flexed inward and thereby will cause stem 71 to push valve disc 73 off its seat. This will connect the inlet of the slide valve with the atmosphere, through holes 75 in the dump valve housing around its neck 62, and relieve the fluid pressure in the breathing apparatus. The end of tube 68 that extends through boss 69 has a tightly fitting gasket 76 on it between a washer 77 and a shoulder in the boss. This is pressed tightly against the shoulder by a fitting 78 encircling the tube and screwed into the boss and against the washer. By unscrewing this fitting and ring 66, access can be gained to the inside of the dump valve.

An important advantage of this dump valve is that, while it is controlled by the air pressure in the bag, it dumps at the inlet side of the slide valve. This serve a three-fold purpose. First, it controls bag pressure at a comfortable level without actually dumping from the breathing bag pure oxygen supplied by canister 13, because it is the exhaled air that is dumped before it can pass through the slide valve. Second, by dumping the exhaled air directly, some of the moisture in the breath is expelled from the apparatus before it can reach the canister. This reduction of moisture in the breathing circuit reduces the generation of oxygen in the canister at a time when less oxygen is desired. Finally, since the dump valve is operated by the gas pressure in the bag, it will not be opened toward the end of a period of use when it may become necessary for the wearer to exhale with more pressure in order to overcome increasing breathing resistance in the canister. If the valve opened under such conditions, the canister would generate less oxygen and the breathing bag would collapse.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A breathing apparatus slide valve for connecting both an exhalation tube and a breathing bag inlet with the concentric inlet and outlet ports respectively of a removable air-purifying canister and for connecting the exhalation tube directly and only with the bag inlet when the canister is removed, said valve comprising a casing provided with an inlet port adapted to be connected to the exhalation tube and with an outlet port adapted to be connected to the bag inlet, one of said valve ports being at the side of the casing and the other being at one end of the casing, the opposite end of the casing being provided with an opening, a tubular coupling slidably mounted in said opening and having its outer end formed for sealing engagement with the canister around the canister's outer port, the inside of the casing having a valve seat around its end port and having an intermediate annular valve seat between its side port and said opening and facing the end seat, tubular means spaced radially inward from the intermediate seat, the outer end of said means extending through said coupling and adapted to be sealingly engaged by the wall of the inner port of the canister when the canister pushes said coupling farther into the casing, a sleeve valve slidably mounted on the inner end of said tubular means and formed to seat against said seats alternately so that when it engages the end seat said side port is in direct communication with the inside of said coupling and when the sleeve valve engages the intermediate seat the side port is in direct communication with said end port, a spring normally holding the sleeve valve against the intermediate seat, said coupling being formed at its inner end for pushing said sleeve valve away from the intermediate seat and against the end seat when the coupling is pushed by the canister, the inner end of the coupling wall being provided with openings for flow of air across the intermediate seat, the sleeve valve being provided with an inner annular valve seat, and a valve member inside the sleeve valve between its seat and said casing opening and engaging said sleeve seat while the sleeve valve is seated on said intermediate seat, whereby to shut off communication between said end port and tubular means.

2. A slide valve in accordance with claim 1, in which the outer end of the tubular coupling is spaced from the casing, and a resilient sealing ring connects the outer end of the coupling with the adjacent end of the casing.

3. A slide valve in accordance with claim 1, in which the tubular coupling normally is spaced a short distance from said sleeve valve.

4. A slide valve in accordance with claim 1, in which a spring holds said valve member against said sleeve seat and means are provided for slidably supporting said valve member and limiting its movement toward said end port when the sleeve valve is moved into engagement with said end seat.

5. A slide valve in accordance with claim 1, in which the sleeve valve includes a sleeve provided with an encircling closure member normally engaging the intermediate seat and with a closure member normally spaced from the end seat, and said spring encircles the sleeve and is compressed between said first-mentioned closure member and the ported end of the casing.

6. A breathing apparatus slide valve for connecting both an exhalation tube and a breathing bag inlet with the concentric inlet and outlet ports respectively of a removable air-purifying canister and for connecting the exhalation tube directly and only with the bag inlet when the canister is removed, said valve comprising a casing provided with an inlet port adapted to be connected to the exhalation tube and with an outlet port adapted to be connected to the bag inlet, one of said valve ports being at the side of the casing and the other being at one end of the casing, the opposite end of the casing being provided with an opening, a tubular coupling slidably mounted in said opening and having its outer end formed for sealing engagement with the canister around the canister's outer port, the inside of the casing having a valve seat around its end port and having an intermediate annular valve seat between its side port and said opening and facing the end seat, a stationary cylinder spaced inward from the intermediate seat, a rigid tube slidably mounted in the cylinder with its outer end extending through said coupling and adapted to be sealingly engaged by the wall of the inner port of the canister when the canister pushes said coupling farther into the casing, a sleeve valve slidably mounted on said cylinder and projecting therefrom toward said end seat, the sleeve valve being formed to seat against said seats alternately so that when it engages the end seat said side port is in direct communication with the inside of said coupling and when the sleeve valve engages the intermediate seat the side port is in direct communication with said end port, a spring normally holding the sleeve valve against the intermediate seat, said coupling being formed at its inner end for pushing said sleeve valve away from the intermediate seat and against the end seat when the coupling is pushed by the canister, the inner end of the coupling side wall being provided with openings for flow of air across the intermediate seat, the sleeve valve being provided with an inner annular valve seat, a valve member inside the sleeve valve between its seat and said rigid tube, and a spring inside said cylinder compressed between said valve member and rigid tube for urging the tube outward and for holding the valve member against said sleeve seat while the sleeve valve is seated on said intermediate seat, whereby to shut off communication between said end port and rigid tube.

7. A breathing apparatus slide valve for connecting both an exhalation tube and a breathing bag inlet with the concentric inlet and outlet ports respectively of a removable air-purifying canister and for connecting the exhalation tube directly and only with the bag inlet when the canister is removed, said valve comprising a casing provided with an inlet port adapted to be connected to the exhalation tube and with an outlet port adapted to be connected to the bag inlet, one of said valve ports being at the side of the casing and the other being at one end of the casing, the opposite end of the casing being provided with an opening, a tubular coupling slidably mounted in said opening and having its outer end formed for sealing engagement with the canister around the canister's outer port, the inside of the casing having a valve seat around its end port and having an intermediate annular valve seat between its side port and said opening and facing the end seat, tubular means spaced radially inward from the intermediate seat, the outer end of said means extending through said coupling and adapted to be sealingly engaged by the wall of the inner port of the canister when the canister pushes said coupling farther into the casing, a sleeve valve slidably mounted on the inner end of said tubular means and formed to seat against said seats alternately so that when it engages the end seat said side port is in direct communication with the inside of said coupling and when the sleeve valve engages the intermediate seat the side port is in direct communication with said end port, a spring normally holding the sleeve valve against the intermediate seat, said coupling being formed at its inner end for pushing said sleeve valve away from the intermediate seat and against the end seat when the coupling is pushed by the canister, the inner end of the coupling wall being provided with openings for flow of air across the intermediate seat, the sleeve valve being provided with an inner annular valve seat, a valve disc inside the sleeve valve between its seat and said casing opening, a spring holding the disc against said sleeve seat while the sleeve valve is seated on said intermediate seat, a stem projecting from said disc past said sleeve seat, and a hollow boss supported by the casing and slidably receiving said stem, said boss limiting the distance the disc can be moved toward said end port when the sleeve valve is moved into engagement with said end seat.

8. A breathing apparatus slide valve for connecting both an exhalation tube and a breathing bag inlet with the concentric inlet and outlet ports respectively of a removable air-purifying canister and for connecting the exhalation tube directly and only with the bag inlet when the canister is removed, said valve comprising a casing provided with an inlet port adapted to be connected to the exhalation tube and with an outlet port adapted to be connected to the bag inlet, one of said valve ports being at the side of the casing and the other being at one end of the casing, the opposite end of the casing being provided with an opening, a tubular coupling slidably mounted in said opening and having its outer end formed for sealing engagement with the canister around the canister's outer port, the inside of the casing having a valve seat around its end port and having an intermediate annular valve seat between its side port and said opening and facing the end seat, tubular means spaced radially inward from the intermediate seat, the outer end of said means extending through said coupling and adapted to be sealingly engaged by the wall of the inner port of the canister when the canister pushes said coupling farther into the casing, a sleeve valve slidably mounted on the inner end of said tubular means and formed to seat against the intermediate seat, a spring normally holding the sleeve valve against the intermediate seat, the sleeve valve including a sleeve normally spaced from the end seat, the end of the sleeve adjacent the end seat being provided with an inner annular closure member having an outer face adapted to seat against the end seat and having an inner face forming an internal valve seat, said coupling being formed at its inner end for pushing said sleeve valve away from the intermediate seat and against the end seat when the coupling is pushed by the canister, the inner end of the coupling wall being provided with openings for flow of air across the intermediate seat, an axially movable valve member inside said sleeve between said internal valve seat and the opposite end of the sleeve, and a spring holding said valve member against said internal seat while the sleeve valve is seated on said intermediate seat, whereby to shut off communication between said end port and tubular means.

References Cited in the file of this patent

UNITED STATES PATENTS

| Number | Name | Date |
|---|---|---|
| 1,337,026 | Stolle | Apr. 13, 1920 |
| 1,753,662 | Merker | Apr. 8, 1930 |
| 2,403,981 | Jackson | July 16, 1946 |